United States Patent Office
3,421,416
Patented Jan. 14, 1969

1

3,421,416
METHOD AND APPARATUS FOR JOINTING SIDE PANELS OF A CARTON MADE FROM THERMOPLASTIC COATED CARTON MATERIAL
Boye Benzon-Petersen, Lund, Sweden, assignor, by mesne assignments, to AB Akerlund & Rausing, Lund, Sweden, a Swedish company
Filed Oct. 1, 1965, Ser. No. 492,101
Claims priority, application Switzerland, Oct. 14, 1964, 13,327/64
U.S. Cl. 93—51.1                   2 Claims
Int. Cl. B31b 1/32; B31b 1/26; B31b 1/44

ABSTRACT OF THE DISCLOSURE

In jointing plastic-coated carton and similar rigid plastic material, the free end edge portions are brought together with the edges lying along each other and the plane side lying against each other; the material adjacent the portions to be joined is locked between rigid supports with the end edge portions free; the end edges are pressed inward against the rest of the material—with associated heating in the case where the material is heat-sealable—by a pressing member, acting against said supports, whereby the material in the joint is creased forming a tight seal.

---

When jointing plastic coated carton and similar rigid materials for packages and the like there have long been considerable problems and this applies in particular to packaging of greasy products. The cut surface which is obtained in such a way that it faces the goods in most normal sealing methods is as a matter of fact very difficult to seal, and in these cases it is more advantageous to use a so-called folded-out fin, which is folded inward against the side of the carton, but this gives a bulky joint which will easily break open because of the rigidity of the material.

The present invention, however, provides a method of jointing thermoplastic coated carton material through which the above problems are eliminated and which is characterized in that the free end marginal portions of the material to be jointed are disposed in a position with their edges placed along each other and with their plane sides facing each other, that the material nearest to the joint proper is secured between supporting jaws or the like, and that the free end marginal portions, preferably with the end edges fixed adjacent each other and under simultaneous heating of the material are pressed inward against the rest of the material by a pressing jaw using a supporting jaw as an abutment, whereby the material in the joint is creased so as to form a tight seal. By profiling the pressing jaw and/or the supporting jaw acting as an abutment therefor it is possible to determine in advance the shape of the joint obtained.

The invention gives several advantages. Among other things a large sealing area is obtained in relation to the thickness of the material. When using heat in connection with the sealing, the plastic flows out and fills all cracks giving, eventually, together with the carton fibers a very good rigidity in corners and the like. By extending the marginal portions used for sealing, said portions projecting like fins prior to the sealing proper, it is possible to obtain an extra large thickened portion along the joint and consequently an additional reinforcement. Besides, on account of the heat the carton is easy to shape.

The method according to the invention is not restricted to carton corner seals only, even though considerable advantages are gained in such seals, but it may also be used for instance for uniting two panels lying in the same plane. When heat-sealing a plastic coated carton material a continuous plastic layer is obtained through the method according to the invention. The sealing method may for instance be used for sealing of longitudinal joints in sleeves or as edge seals in troughs or the like, in which latter case no minimum height has to be observed, contrary to what was the case before, but these may be given any suitable height down to a couple of milimetres.

The invention also relates to a device intended for use in jointing by means of the method described above, the said device being characterized by supporting jaws arranged to secure the material adjacent to the joint in such a way that free end marginal portions forming fins for the joint proper are moved to a position with the edges of the fins lying along each other and with their plane sides lying against each other, and by a pressing jaw for pressing the free end edge portions inward against the rest of the material using a supporting jaw as an abutment and, in the case of heat-sealable material, under simultaneous heating with suitable heating means.

Further particulars and advantages of the invention will be apparent from the accompanying drawing showing an embodiment of the invention chosen by way of example, and where FIG. 1 shows a diagrammatic and perspective view of a machine having two devices according to the embodiment for simultaneous manufacture of two cartons;

Figure 6:
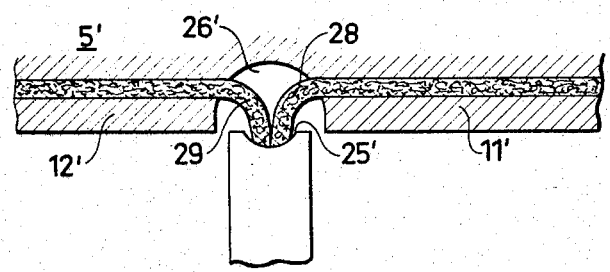

FIG. 6, finally, shows a modified embodiment of the jointing device according to the invention intended for longitudinal jointing.

Figure 1:
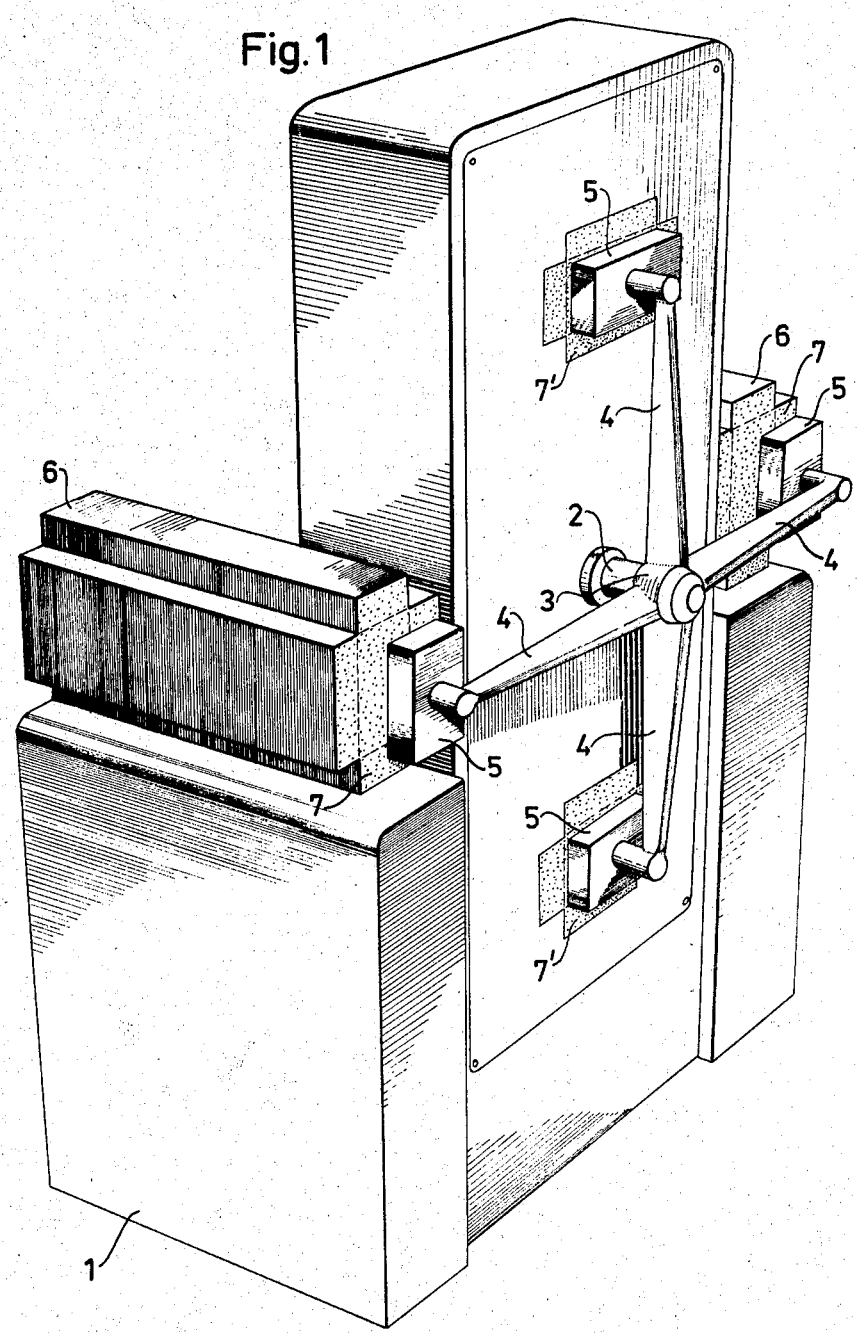
Figure 2:
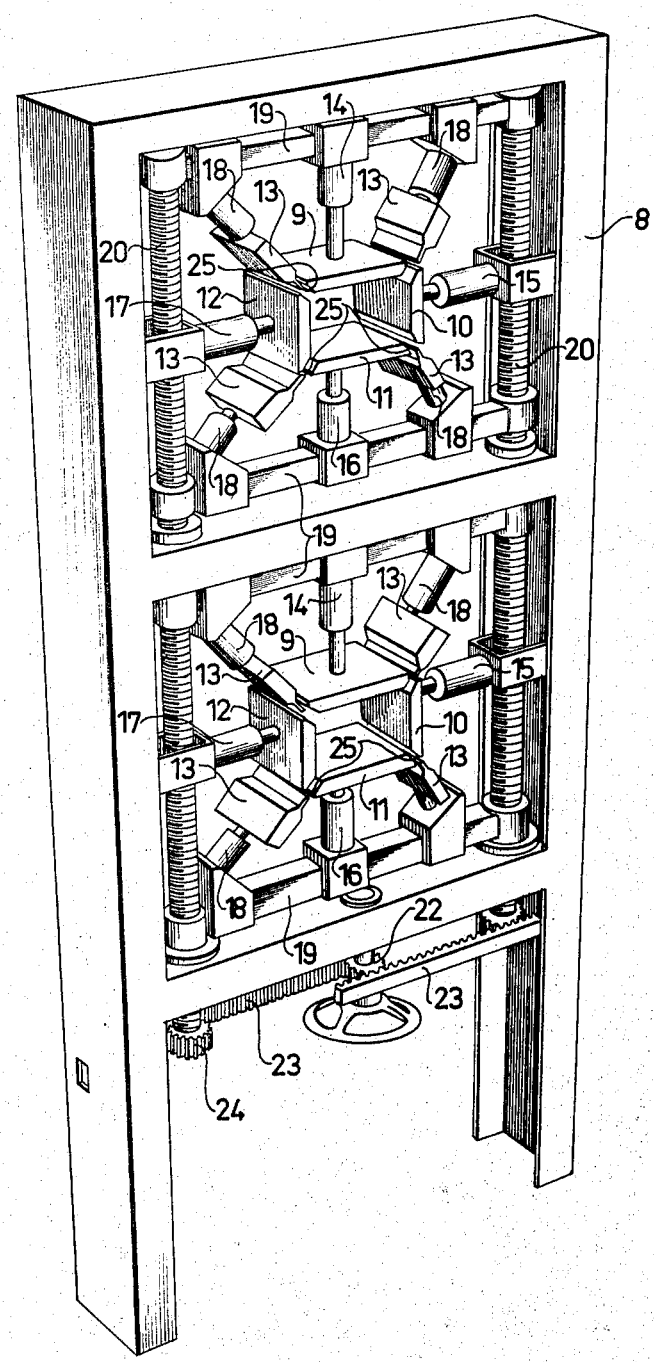
FIG. 2 shows a frame disposed in the interior of the machine according to FIG. 1 and having adjustable pressing and supporting jaws.

In the machine shown in FIG. 1 the machine housing is designated 1. From this there projects a shaft 2 which carries a turret 3 having four arms 4, each of which carries a supporting jaw 5 having a parallelepipedic configuration and including means, not illustrated, for establishing a suction on its front face for holding a carton blank against it. The supporting jaw 5 is termed an inner supporting jaw in the following. The inner supporting jaws are arranged to suction grip blanks 7 in two blank magazines 6 shown diagrammatically, said blanks being of the kind shown in greater detail in FIG. 4 and being described in more detail below. The blanks 7 are moved by the inner supporting jaws 5 to two entry openings which are slightly larger than the portion of the blank which corresponds to the carton bottom and which is concealed in FIG. 1 by the blanks 7 supported by the inner supporting jaws on the vertically upright arms 4. Through these entry openings the blanks are introduced under simultaneous upward folding of the side walls 7b of the blank of FIG. 4 to sealing positions opposite the frame 8 shown separately in FIG. 2 which among other things contains a double set of four outer supporting jaws 9, 10, 11, 12 and four pressing jaws 13, of which the former are operated by four hydraulic cylinders 14, 15, 16 and 17, while the latter are operated by four hydraulic cylinders 18. Due to the fact that the outer and oppositely disposed supporting jaws 9 and 11 and the pressing jaws 13 are disposed on horizontal transverse bars 19 which in turn are threaded on vertical setting screws 20 provided with righ-hand and left-hand threads, these jaws can easily be set in the vertical sense in order to be adjusted to different carton sizes. The pressing jaws 13 are simultaneously adjustable in the lateral sense on the transverse bars 19. Also the lateral supporting jaws 10 and 12 should, of course, be adjustable laterally, although this has not been shown. This may be done by exchanging jaws and/or piston rods. Preferably, however, it takes place by providing them with extendable piston rods. e.g. of the telescopic type. The adjustment of the vertical screws is done by means of a wheel via a rack and pinion transmission consisting of two racks 23 and pinions 22 and 24. A chain transmission may alternatively be used for the same purpose. In the jointing position, the inner rectangular jaws 5 will be located within the rectangular openings established by the upper and lower sets of outer jaws 9–12 which are then advanced to secure the carton blank with its folded up side panels.

Figure 3:
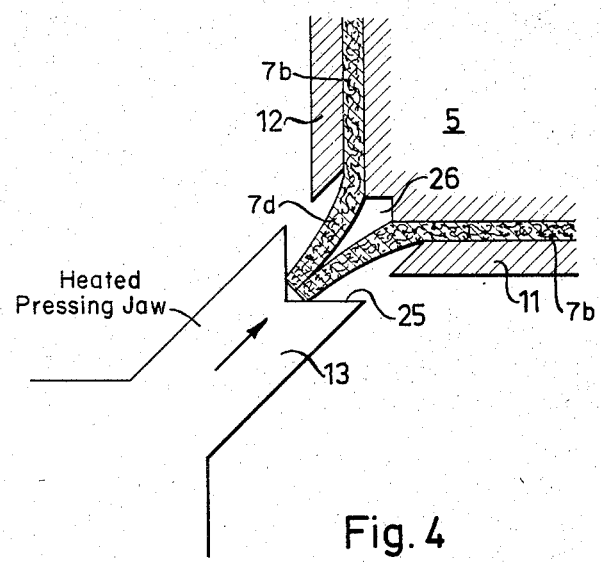
FIG. 3 shows, on a larger scale, a corner of a carton after the sides of the carton blank have been folded upwards but before the jointing proper has taken place.
Figure 5:
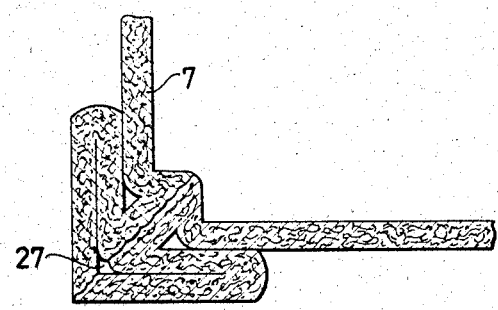
FIG. 5 shows the completed carton corner.

The jointing proper is best shown in FIG. 3 which shows on a larger scale a corner of the blank 7 secured between the inner supporting jaw 5 and the outer or lateral supporting jaws 11 and 12 before the pressing jaw 13 has been pressed against the corner under simultaneous heating by conventional means, not shown, and has caused a seal of the kind shown in FIG. 5 to be formed by crushing the fins 7d edgewise and inwardly. The shape of the joint obtained is determined by the shape of the pressing jaw 13 and the inner supporting jaw 5 which are equipped in the case shown with recesses 25 and 26, respectively. When heat-sealing a plastic coated carton a special advantage is gained in that possible cavities, e.g. 27, are completely filled with plastic.

Figure 4:
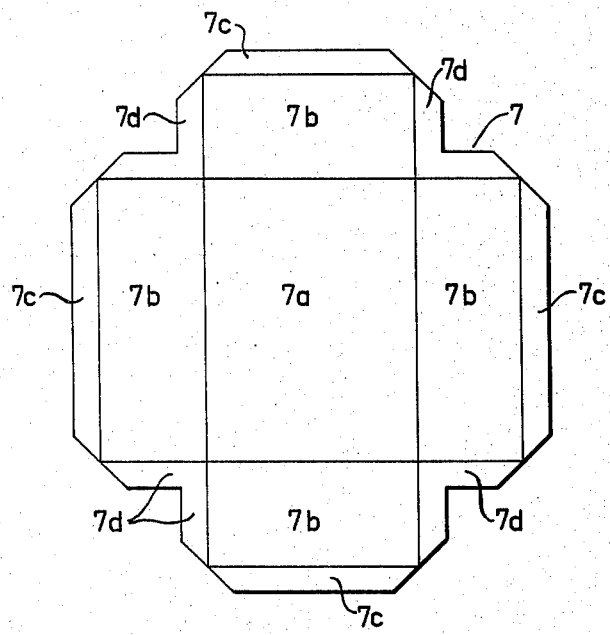
FIG. 4 shows the carton blank.

The carton blank 7 shown in FIG. 4 is divided by crease lines into a bottom panel 7a, four side panels 7b, four edge panels 7c and four angular sealing fins 7d. The edge panels 7c, which are meant to be folded down on the outside of the carton, provide, in the completed carton, an upper completely plastically coated edge which may serve as a support for a cover sheet or the like at the final closing of a filled carton.

FIG. 6 shows a modified jointing method through which a longitudinal joint is produced between two panels 28 and 29 lying in the same plane, the edge portions of which have been folded upwards about 90°. As the main principal is in other respects the same as in the method described in FIG. 3, the same reference numerals have been used as in the said figure, but with the addition of a prime.

The invention is not, of course, restricted to the embodiments shown and described above but may be varied within the scope of the appended claims.

I claim:
1. The method of jointing the ends of adjacent side panels of a carton made from a blank of material provided with a heat-sealable thermoplastic coating to establish a corner of the carton defined by said two side panels and a bottom panel to which said side panels are joined, which comprises the steps of:
   (a) establishing fins along the ends of said adjacent panels,
   (b) holding said side panels in such position as to bring said fins together in essentially parallel relation at an angle to the plane of their respective side panels and with the free edges of said fins meeting one another along the entire length thereof, and
   (c) applying a force directed in an edgewise manner against said free edges of said fins together with an application of heat to the fins thereby to effect a crushing of said fins and a sealing together with the thermoplastic thereby to establish a sealed corner joint.

2. Apparatus for jointing the meeting ends of four side panels of a carton made from a blank of material provided with a heat-sealable thermoplastic coating and wherein said side panels are folded up at a right angle from a bottom panel of the carton blank and wherein said side panels include a sealing fin at each end thereof, said apparatus comprising a parallelepipedic inner jaw the front face of which contacts the bottom panel of said blank and the four sides of which contact respectively the four side panels of said blank, four movable outer jaws each of which is so located as to contact a corresponding one of said side panels but not including the end fins, means for moving said outer jaws towards and away from said inner jaw, movement of said outer jaws towards said inner jaw serving to apply pressure against said side panels and to secure adjacent side panels at a right angle to each other and with the sealing fins at the ends of the adjacent side panels brought together at an angle to their respective side panels and having their free edges meeting one another along the entire length thereof, four pressing jaws arranged respectively at each of the corners of said inner jaw, and means for moving said pressing jaws towards the corresponding corners of said inner jaw to engage the free edges of said fins and effect a crushing in of said fins with an edgewise applied force together with an application of heat thereby to unite and seal the fins with the thermoplastic material and establish the corner joints of the carton, each of said pressing jaws including a recess cooperating with a recess at each corner of said inner jaw for guiding the fins as they are crushed in by the application of pressure from the pressing jaws.

References Cited

UNITED STATES PATENTS

| | | | |
|---|---|---|---|
| 1,220,517 | 3/1917 | Kondolf | 93—36.3 |
| 1,738,334 | 12/1929 | Taber. | |
| 1,915,976 | 6/1933 | Brodsky | 93—41 |
| 2,120,902 | 6/1938 | Moore | 93—51 X |
| 2,437,057 | 3/1948 | Waters. | |
| 2,826,127 | 3/1958 | Straw | 93—51 |
| 2,834,395 | 5/1958 | Russell. | |
| 3,303,760 | 2/1967 | Tobias | 93—44.1 |
| 3,339,340 | 9/1967 | Piazze | 93—36.5 X |

FOREIGN PATENTS

| | | |
|---|---|---|
| 662,280 | 4/1963 | Canada. |
| 882,896 | 3/1943 | France. |
| 887,495 | 1/1962 | Great Britain. |

WAYNE A. MORSE, JR., *Primary Examiner.*

U.S. Cl. X.R.

93—1, 36, 36.3, 36.5, 41, 59